(12) United States Patent
Becker et al.

(10) Patent No.: US 7,185,129 B2
(45) Date of Patent: Feb. 27, 2007

(54) METHOD FOR CONFIGURING AND/OR OPERATING AN AUTOMATION DEVICE HAVING A MASTER UNIT CONNECTED TO ONE OR MORE SLAVE UNITS

(75) Inventors: Peter Becker, Gaggenau (DE); Albert Renschler, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 210 days.

(21) Appl. No.: 10/957,594

(22) Filed: Oct. 5, 2004

(65) Prior Publication Data

US 2005/0154809 A1 Jul. 14, 2005

Related U.S. Application Data

(63) Continuation of application No. PCT/DE03/01137, filed on Apr. 7, 2003.

(30) Foreign Application Priority Data

Apr. 5, 2002 (DE) ................. 102 15 121

(51) Int. Cl.
*G06F 13/00* (2006.01)
*G06F 13/36* (2006.01)
*G05B 19/18* (2006.01)
*G05B 11/01* (2006.01)
*G06F 3/33* (2006.01)
*G09G 5/00* (2006.01)

(52) U.S. Cl. ................ 710/110; 710/10; 710/104; 709/208

(58) Field of Classification Search ................ 710/110, 710/104, 10, 117, 73; 709/203, 209, 208; 700/173; 370/463; 715/810; 713/100
See application file for complete search history.

(56) References Cited

U.S. PATENT DOCUMENTS 5,729,720 A * 3/1998 Kau et al. ............... 713/500

(Continued)

FOREIGN PATENT DOCUMENTS

EP 0 807 887 A2 11/1997

(Continued)

OTHER PUBLICATIONS

"Design for verification of SystemC transaction level models" by Habibi et al. (abstract only) Publication Date: 2005.*

(Continued)

*Primary Examiner*—Gopal C. Ray
(74) *Attorney, Agent, or Firm*—Sughrue Mion, PLLC

(57) ABSTRACT

A method and an engineering system that reduce the configuration complexity with regard to a possible expansion of the automation device are provided. The automation device includes slave units and a master unit (7, 15) connected to the slave units via a bus. The slave units include one or more slave units (11, 12, 16, 17) and one or more reserve slave units (13, 18). The configuration of a reserve slave unit (13, 18) enables the master access time interval (20) and the slave access time intervals (21, 22, 23) to be expanded for a possible expansion of the automation device. As a result, a configured automation device of this type can be expanded by an additional slave unit without additional configuration or reconfiguration.

9 Claims, 2 Drawing Sheets

U.S. PATENT DOCUMENTS

| | | | |
|---|---|---|---|
| 5,784,291 A | * | 7/1998 | Chen et al. .................... 716/10 |
| 5,870,621 A | * | 2/1999 | Walsh et al. ................... 712/32 |
| 5,875,312 A | * | 2/1999 | Walsh et al. ................ 710/303 |
| 6,421,754 B1 | * | 7/2002 | Kau et al. .................... 710/261 |

FOREIGN PATENT DOCUMENTS

| | | |
|---|---|---|
| EP | 1 199 846 A1 | 4/2002 |
| WO | WO 94/15299 A1 | 7/1994 |
| WO | WO 00/69116 A3 | 11/2000 |

OTHER PUBLICATIONS

"Profibus Manuel Technique", Brochure No. 4.002-FR, Sep. 1, 1999, Profibus International.

Siemens AG, Catalog ST70, Chapters 4 und 6, 2001 Edition ("Simatic S7-400 Power SPS" and "Dezentrale Peripherie".

Siemens AG, "Katalog ST PCS 7, Chapter 2", 2001 Edition ("Simatic Prozessleitsystem Simatic PCS 7").

* cited by examiner

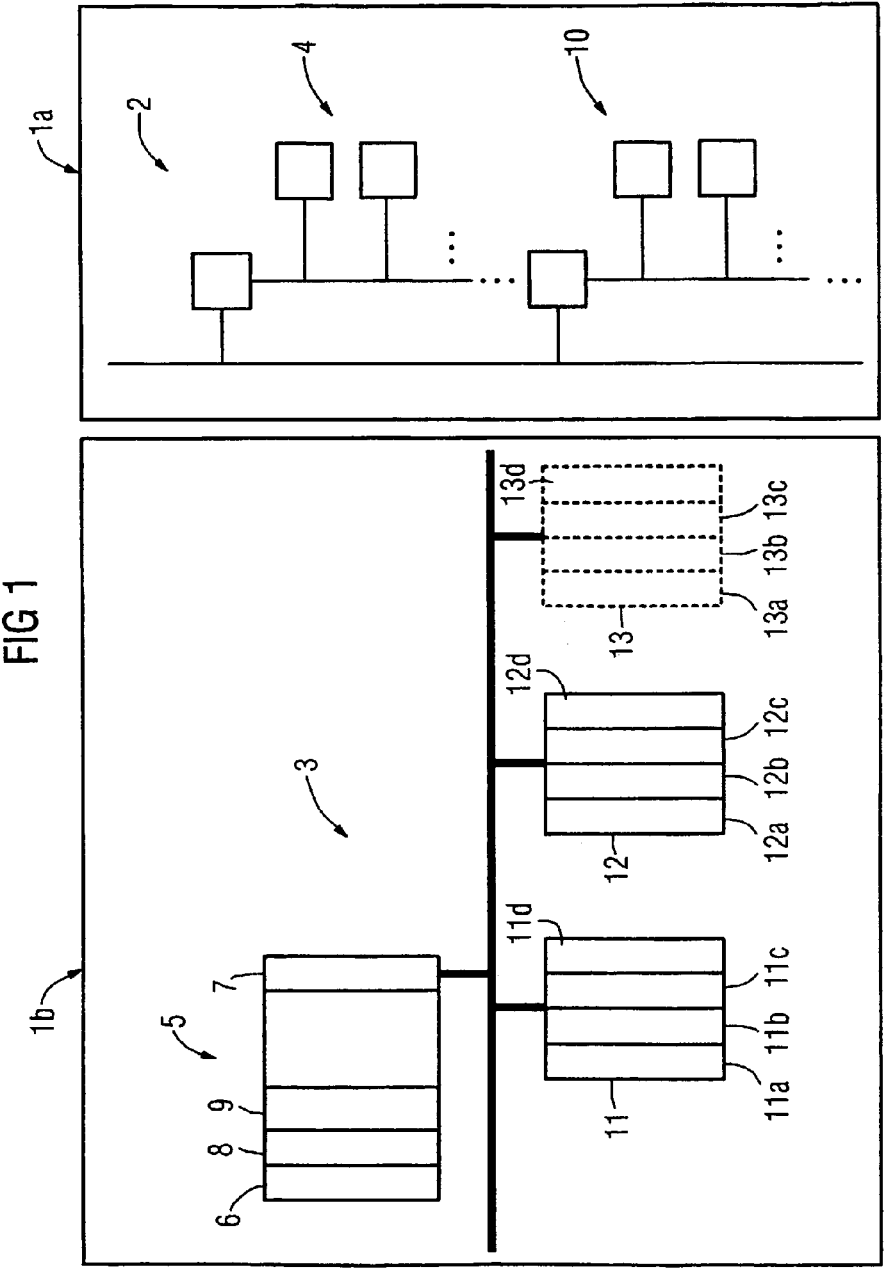

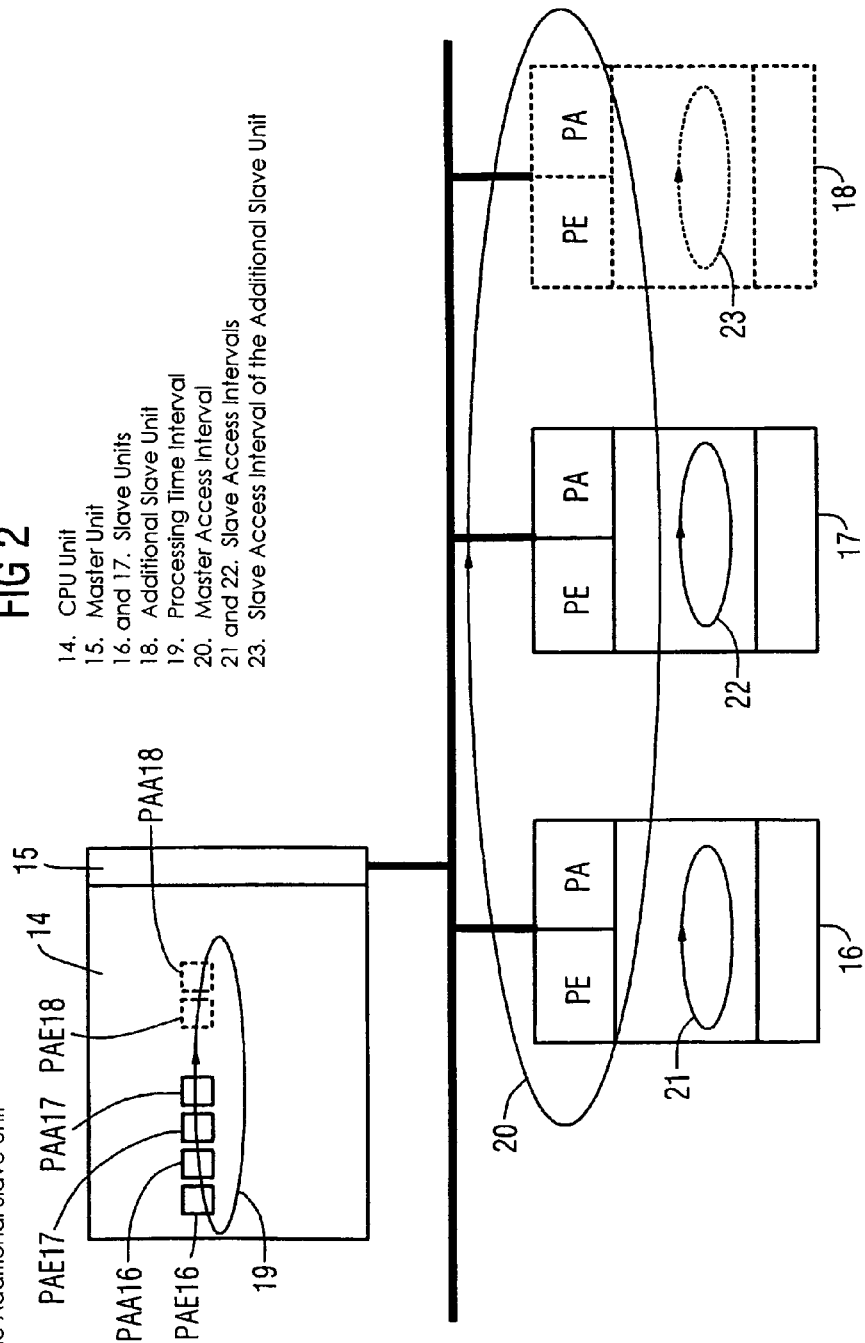

METHOD FOR CONFIGURING AND/OR OPERATING AN AUTOMATION DEVICE HAVING A MASTER UNIT CONNECTED TO ONE OR MORE SLAVE UNITS

This is a Continuation of International Application PCT/DE03/01137, with an international filing date of Apr. 7, 2003, which was published under PCT Article 21(2) in German, and the disclosure of which is incorporated into this application by reference.

FIELD AND BACKGROUND OF THE INVENTION

1. Field of the Invention

The present invention relates to a method and an engineering system for configuring and/or operating an automation device. In particular, the present invention relates to a method and an engineering system for configuring an/or operating an automation device with a master unit and at least one slave unit that can be connected to the master unit via a bus.

2. Description of Related Art

An automation device with so-called "decentralized peripherals" is known from the Siemens Catalog ST 70, Chapter 6, 2001 Edition, which is incorporated herein by reference. These "decentralized peripherals" are provided for decentralized solutions to automation tasks in production engineering, process engineering and systems control engineering. These decentralized peripherals usually include different peripheral devices with a number of slave modules, which are connected to a master unit via a bus. The master unit is usually a master module, which is a component of a powerful programmable controller having at least one CPU and further functional modules to solve complex automation tasks.

Actuators and/or sensors can be connected to the slave modules of a slave unit. Peripheral process input data transmitted by the sensors can be stored in the slave units. Moreover, the slave units can supply the actuators with peripheral process output data, which the master unit transmits to the slave units. An essential task of the master unit, on the one hand, is to transmit the peripheral process input data as an image to a higher-level processing unit of a programmable controller and, on the other hand, to process the image of the peripheral process output data supplied to the master unit by the higher-level processing unit and then to transmit this processed peripheral process output data to the slave units in the form of peripheral process output data. The higher-level processing unit cyclically processes the image of the peripheral process input data and that of the peripheral process output data during a processing time interval. This processing time interval (processing cycle) is essentially coordinated with a master access interval (master cycle) of the master unit. During this master access interval, the master unit performs read and/or write accesses to all of the slave units that are connected to the bus during an open loop control.

The master unit cyclically transmits to each slave unit the peripheral process output data associated with the corresponding slave units, such that the master access interval is essentially determined by the number of slave units connected to the bus. In response to the transmission of the peripheral process output data, each slave unit performs a write access to the bus during a slave-specific slave access interval, in order to transmit its peripheral process output data to the master unit. The length of the master access interval essentially depends on the number of the slave units connected to the master unit. The slave units themselves monitor their own slave access intervals. In the event that a slave unit is not accessed within its slave access interval, which indicates that peripheral process outputs of this slave unit are no longer addressed, that slave unit switches its peripheral process outputs to a safe state.

The number of the slave units that can be connected to the master unit is configured using, e.g., an engineering system, which is known from the Siemens Catalog ST PCS 7, Chapter 1, 2001 Edition, which is incorporated herein by reference. The number of the slave units to be configured depends on the control task to be solved.

It may occur, for example, that due to changes in the control task to be solved, the automation device must be expanded by an additional slave unit. This means that this additional slave unit must be newly configured such that the master access interval and the respective slave access intervals are respectively increased to accommodate for the additional slave unit. This is time-consuming, particularly because the new configuration must be tested prior to any open loop control operation.

OBJECTS OF THE INVENTION

One object of the present invention is to provide a method for configuring and/or operating an automation device, which reduces the configuration time with respect to a possible expansion of the automation device. A further object of the invention is to provide an engineering system, which makes it possible to carry out the method for configuring the automation device. Yet another object is to provide an automation device that is expandable by one or more additional slave units for a control without reconfiguration with respect to the master access interval and the slave access intervals.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an exemplary, non-limiting embodiment of the present invention, a method for at least one of configuring and operating an automation device is provided. In this exemplary, non-limiting method, the automation device has a master unit and one or more slave units connected to the master unit via a bus. In this method, a number of the slave units, which include one or more slave units and one or more additional slave units, are configured during a configuration phase in order to define a master access interval during which the master unit performs at least one of read access and write access to the bus in the control of the automation device, and a slave access interval for each of the slave units. During the defined slave access interval, a respective slave unit performs at least one of read access and write access to the bus in the control of the automation device. In this method, the automation device is expanded by the one or more additional slave units for the control without additional reconfiguration of the automation device. In this exemplary method, the master access interval and respective slave access intervals are prepared for an expansion of the automation device by the one or more additional slave units.

In accordance with another exemplary, non-limiting embodiment, an engineering system for configuring an automation device is provided. The automation device in this system has a master unit and one or more slave units connected to the master unit via a bus. In this system, a type and/or a number of the slave units, which include one or more slave units and one or more additional slave units, is configured by the engineering system during a configuration phase in order to define a master access interval and slave access intervals. In this system, a master access interval is defined for the master unit to perform at least one of a read access and a write access to the bus in the control of the automation device. In addition, a slave access interval is defined for each of the slave units. During the defined slave access interval, a respective slave unit performs at least one of a read access and a write accesses to the bus in the control of the automation device. In this system, the automation device is expanded by the additional slave units for the control without reconfiguration of the automation device. Moreover, the engineering system prepares the master access interval and respective slave access intervals for an expansion of the automation device by the additional slave units.

According to another exemplary, non-limiting embodiment of the present invention, an automation device is provided. The automation device has a master unit, a number of slave units, which include one or more slave units and one or more reserve slave units, and a bus connecting the master unit to the slave units. In this automation device, a number of the slave units is configured during a configuration phase in order to define a master interval and slave access intervals. The master interval is defined to allow the master unit to perform at least one of read and write accesses to the bus in the control of the automation device during the master access interval. The slave access interval is defined for each of the slave units. During the define slave access interval, a respective slave unit performs at least one of a read access and a write access to the bus in the control of the automation device. The automation device is expanded by the one or more reserve slave units for the control without reconfiguration of the automation device. Moreover, the master access interval and the slave access intervals are prepared for an expansion of the automation device by the one or more reserve slave units.

According to the exemplary, non-limiting embodiments of the present invention, by configuring at least one "reserve slave unit" or the additional slave unit, both the master access interval and the corresponding slave access intervals are prepared for a possible expansion of the automation device by this additional slave unit. If the automation device is in fact expanded by the additional slave unit, there is no repercussion, i.e., the master access interval and the corresponding slave access intervals are not affected. Moreover, a reconfiguration and testing of the automation unit expanded by the additional slave unit is not required.

BRIEF DESCRIPTION OF THE DRAWINGS

The present invention will now be described in detail by describing illustrative, non-limiting embodiments thereof with reference to the accompanying drawings. In the drawings, the same reference characters denote analogous elements:

FIG. 1 shows a user interface of an engineering system in accordance with an exemplary, non-limiting embodiment of the present invention, and FIG. 2 shows a configured automation device in accordance with another exemplary, non-limiting embodiment of the present invention.

DETAILED DESCRIPTION OF ILLUSTRATIVE, NON-LIMITING EMBODIMENTS

FIG. 1 shows an engineering system with a display. This display has two windows of a user interface, designated 1a and 1b, respectively. The window 1a is provided to display a hardware library 2 of an automation device, while the window 1b displays the currently configured hardware of an automation device 3. The hardware library 2 contains configuration data for modules of a programmable controller, e.g., CPU modules, communication modules, digital input and/or output modules, and configuration data for modules of peripheral devices and bus systems with associated bus connections. To configure the automation device, an operator uses his mouse in a drag and drop operation to select a hardware component from the window 1a, copy the selected hardware component to the window 1b and combine the components in the window 1b with the copied component in accordance with a control task to be solved.

In the depicted example, a programmable controller 5 with a CPU module 6, a master unit 7, and two additional components 8 and 9, is selected from a list 4 of the hardware library 2. Of course the master unit does not have to be a part of the programmable controller 5. Instead, the master unit can be selected as a component of a central device that includes a number of modules and that is connected to the programmable controller via a bus. Moreover, in the depicted example, a first, a second and a third slave unit 11, 12, and 13, respectively, are selected from a list 10 of the hardware library 2. These slave units 11, 12, and 13 have a number of slave modules 11a . . . 11d, 12a . . . 12d, and 13a . . . 13d, respectively. These slave modules 11a . . . 11d, 12a . . . 12d, and 13a . . . 13d can be selected from the hardware library 2 and are connected to the master unit 7 via a bus connection. The bus connection is also selected from the hardware library 2. The master unit 7, the slave units 11, 12, and 13, and the bus connection for coupling the units, are components of the decentralized peripheral devices.

The slave units 11, 12, and 13 can have the same or different functionalities. The engineering system is configured to allow an operator to configure reserve slave units with user data areas assigned to these reserve slave units. These reserve slave units can be selected from the hardware library 2 and are specifically identified in the display of the window 1b, as illustrated in FIG. 1. In the depicted example, the slave unit 13 is identified as a reserve slave unit illustrated by dashed lines in FIG. 1. For this configured reserve slave unit 13, the automation device is expanded by a slave unit of any functionality based on changes in a control task to be solved. Through the configured master unit 7 and slave units 11, 12, and 13, a master access interval is defined, during which the master unit performs read and/or write accesses to the bus during a control of the automation device. The control of the automation device, for example, may be an open loop control or a closed loop control. In addition, through the configured master unit 7 and slave units 11, 12, and 13, a slave access interval is defined for each slave unit. During the defined slave access interval, a respective slave unit performs read and/or write accesses to the bus during the control of the automation device.

Reference is now made to FIG. 2, which depicts a configured automation device in accordance with the exemplary, non-limiting embodiment of the present invention. The components of this configured automation device for controlling a technical process are a higher-level CPU unit 14, a master unit 15, and two slave units 16 and 17. The automation device is expandable by an additional slave unit ("reserve slave unit") 18 illustrated in FIG. 2 by dashed lines. The additional slave unit 18 is a reserve slave unit because when configuring the automation device (FIG. 1), the operator has designated this slave unit as a reserve unit for an expansion of the automation device.

During a processing time interval 19, the higher-level CPU unit 14 first reads in the images of the peripheral process input data PAE16, and PAE17 from the master unit 15. Then, the higher-level CPU unit 14 processes this peripheral process input data PAE16 and PAE17 into the peripheral process output data PAA16 and PAA17. Finally, the higher-level CPU unit 14 transmits this output data to the master unit 15. The processing time interval 19 is extended by a processing time for processing the image of the peripheral process input data of the configured reserve slave unit 18, which is depicted in the FIG. 2 by the dashed squares with the reference numerals PAE18 and PAA18. Based on the images of the peripheral process output data transmitted by the higher-level CPU unit 14 to the master unit 15, the master unit 15 transmits peripheral process output data PA to the slave units 16 and 17 during a master access interval 20. The master access interval 20 is extended by a write access to the configured slave unit 18. Likewise, the master access interval is extended by the read access to the additional slave unit 18 in order to read in the peripheral process input data PE, i.e., during a read access by the master unit 15 to the slave units 16 and 17.

In the control of the automation device, during both, the read access and the write access, it is assumed that the configured slave unit has the peripheral process input data and the peripheral process output data, and that both the input and output data must be processed.

During the control, the slave units 16 and 17 monitor their own slave access interval 21 and 22, respectively. For example, when the slave unit 16 is not accessed within the bus access time 21 of the slave unit 16, this means that the peripheral process outputs of this slave unit 16 are no longer addressed. As a result, this slave unit 16 switches its peripheral process outputs to a safe state. In this example, the respective slave access interval 21 and 22 of the slave units 16 and 17, respectively, are extended. This extension is necessary to accommodate for the configured slave unit 18, which has a corresponding configured slave access interval 23 and a corresponding extended master access interval 20.

Through the configuration of the reserve slave unit 18, the master access interval, the respective slave access intervals, and the processing time interval of the higher-level CPU unit 14, are prepared for an expansion of the automation device by the slave unit 18. If or when the automation device is expanded by the slave unit 18, for example, this expansion causes no repercussions, i.e., the master access interval, the corresponding slave access intervals, and the processing time interval of the higher-level CPU unit 14 are not affected. As a result, no reconfiguration and no testing of the automation device expanded by the additional slave unit 18 are required. Of course, one of ordinary skill in art would readily understand that it is possible to configure a number of reserve slave units, which are configured as "neutral" units. By configuring a plurality of reserve units, the automation device can be expanded for the control by the slave units of any functionality (type). Accordingly, it is easy to adapt the system to a change in the control task to be solved.

The above description of illustrative, non-limiting embodiments has been given by way of an example. The above and other features of the invention including various novel method steps and a system and a device of the various novel components have been particularly described with reference to the accompanying drawings and pointed out in the claims. It will be understood that the particular process and construction of parts embodying the invention is shown by way of an illustration only and not as a limitation of the invention. The principles and features of this invention may be employed in varied and numerous embodiments without departing from the scope of the invention as defined by the appended claims and equivalents thereof.

What is claimed is:

1. A method for at least one of configuring and operating an automation device comprising a master unit and at least one slave unit connected to the master unit via a bus, the method comprising:

configuring a number of the slave units, the slave units comprising the at least one slave unit and at least one additional slave unit during a configuration phase in order to define:
a master access interval, during which the master unit performs at least one of a read access and a write access to the bus in a control of the automation device, and
a slave access interval for each of the slave units,
wherein during the defined slave access interval, a respective slave unit performs at least one of a read access and a write access to the bus in the control of the automation device,
wherein the automation device is expanded by the at least one additional slave unit for the control without reconfiguration of the automation device, and
wherein the master access interval and the respective slave access intervals are prepared for an expansion of the automation device by the at least one additional slave unit.

2. The method as claimed in claim 1, wherein the at least one additional slave unit comprises a plurality of additional slave units, and wherein the plurality of additional slave units are in a safe state preceding the expansion of the automation device.

3. The method as claimed in claim 1, wherein the control is an open loop control.

4. The method as claimed in claim 1, wherein the control is a closed loop control.

5. An engineering system for configuring an automation device comprising a master unit and at least one slave unit connected to the master unit via a bus, wherein at least one of a type and a number of the slave units, the slave units comprising the at least one slave unit and at least one additional slave unit, configured by the engineering system during a configuration phase in order to define:
a master access interval for the master unit to perform at least one of a read access and a write access to the bus in a control of the automation device, and
a slave access interval for each of the slave units,
wherein during the defined slave access interval, a respective slave unit performs at least one of a read access and a write access to the bus in the control of the automation device, and wherein the automation device is expanded by the at least one additional slave unit for the control without reconfiguration of the automation device, and wherein the engineering system prepares the master access interval and respective slave access intervals for an expansion of the automation device by the at least one additional slave unit.

6. The engineering system as claimed in claim 5, wherein the at least one additional slave unit comprises a plurality of additional slave units, and wherein the plurality of the additional slave units are in a safe state preceding the expansion of the automation device.

7. The engineering system as claimed in claim 5, wherein the control is an open loop control.

8. The engineering system as claimed in claim 5, wherein the control is a closed loop control.

9. An automation device comprising:

a master unit;

slave units comprising at least one slave unit and at least one reserve slave unit; and a bus connecting the master unit to the slave units, wherein a number of the slave units is configured during a configuration phase in order to define:

a master access interval, the master unit performs at least one of a read access and a write access to the bus in a control of the automation device during the master access interval, and a slave access interval for each of the slave units wherein during the defined slave access interval, a respective slave unit performs at least one of a read access and a write access to the bus in the control of the automation device, wherein the automation device is expanded by the at least one reserve slave unit for the control without reconfiguration of the automation device, and wherein the master access interval and the slave access intervals are prepared for an expansion of the automation device by the at least one reserve slave unit.

* * * * *